(12) United States Patent
Yamada et al.

(10) Patent No.: US 9,325,230 B2
(45) Date of Patent: Apr. 26, 2016

(54) VIBRATION GENERATOR

(75) Inventors: Yuuki Yamada, Ueda-shi (JP); Mitsuru Oi, Ueda-shi (JP)

(73) Assignee: NIDEC SEIMITSU CORPORATION, Ueda-shi (JP)

( * ) Notice: Subject to any disclaimer, the term of this patent is extended or adjusted under 35 U.S.C. 154(b) by 234 days.

(21) Appl. No.: 14/116,041

(22) PCT Filed: Apr. 25, 2012

(86) PCT No.: PCT/JP2012/061006
§ 371 (c)(1),
(2), (4) Date: Nov. 6, 2013

(87) PCT Pub. No.: WO2012/153631
PCT Pub. Date: Nov. 15, 2012

(65) Prior Publication Data
US 2014/0077628 A1    Mar. 20, 2014

(30) Foreign Application Priority Data

May 10, 2011  (JP) .................................. 2011-105331

(51) Int. Cl.
*H02K 33/00* (2006.01)
*H02K 33/06* (2006.01)
(Continued)

(52) U.S. Cl.
CPC ................ *H02K 33/00* (2013.01); *B60B 1/045* (2013.01); *H02K 33/06* (2013.01); *H02K 33/12* (2013.01); *H02K 33/16* (2013.01); *H02K 33/18* (2013.01)

(58) Field of Classification Search
CPC ....... H02K 33/00; H02K 33/02; H02K 33/08; H02K 33/10; H02K 33/14; H02K 33/16; H02K 33/18; H02K 35/00; H02K 35/02; H02K 35/04; H02K 35/06; H02K 33/04; H02K 33/12; B06B 1/04; B06B 1/045; B06B 1/0215
USPC ............... 310/15, 23, 17, 81, 12.16; 318/114, 318/128, 126, 127, 129
See application file for complete search history.

(56) References Cited

U.S. PATENT DOCUMENTS

| 2,769,103 | A | * | 10/1956 | Kristiansen | ............ | H02K 33/06 310/30 |
| 5,896,076 | A | * | 4/1999 | van Namen | ........... | H01F 7/1615 335/222 |

(Continued)

FOREIGN PATENT DOCUMENTS

| CN | 1504269 A | 6/2004 |
| CN | 1792022 A | 6/2006 |

(Continued)

OTHER PUBLICATIONS

International Search Report of PCT/JP2012/061006, mailing date of Aug. 7, 2012.

*Primary Examiner* — Terrance Kenerly
*Assistant Examiner* — Alexander Singh
(74) *Attorney, Agent, or Firm* — Westerman, Hattori, Daniels & Adrian, LLP

(57) ABSTRACT

A vibration generator includes a tubular magnetic case, an end cover holding a first bearing metal, a second bearing metal held in a burring portion of the bottom plate of the case, a non-magnetic movable thrust shaft that is inserted in an axially movable manner spinning the first and second bearing metal, and first to third toroidal coils connected and fixed at the inner circumference of the case. The vibration generator further includes a first annular pole piece fixed to the movable thrust shaft, a first and a second tubular permanent magnet of axial magnetization, a second annular pole piece and third annular pole piece, first and second wight body fixed at both ends of the movable thrust shaft outside the case, a first coil spring between the end cover and the first wight body, and a second coil spring between the bottom plate and the second wight body.

7 Claims, 3 Drawing Sheets

(51) Int. Cl.
*H02K 33/12* (2006.01)
*H02K 33/16* (2006.01)
*B60B 1/04* (2006.01)
*H02K 33/18* (2006.01)

(56) References Cited

U.S. PATENT DOCUMENTS

| | | | |
|---|---|---|---|
| 7,768,160 B1* | 8/2010 | Sahyoun | H02K 33/16 310/14 |
| 2004/0104625 A1 | 6/2004 | Wakuda et al. | |
| 2005/0073205 A1* | 4/2005 | Takagi | H02K 5/00 310/89 |
| 2007/0040457 A1 | 2/2007 | Shimizu et al. | |
| 2009/0134721 A1* | 5/2009 | Zimmerling | B06B 1/045 310/15 |

FOREIGN PATENT DOCUMENTS

| | | |
|---|---|---|
| EP | 1429299 A1 | 6/2004 |
| EP | 1626483 A1 | 2/2006 |
| JP | 11-069754 A | 3/1999 |
| JP | 11-69754 A | 3/1999 |
| JP | 2003-093968 A | 4/2003 |
| JP | 2004-181304 A | 7/2004 |
| JP | 2004-343931 A | 12/2004 |
| WO | 2004/102775 A1 | 11/2004 |

* cited by examiner

VIBRATION GENERATOR

TECHNICAL FIELD

The present invention relates to a vibration generator built in a cellular phone or the like and, more particularly, to the structure of a vibration generator capable of obtaining high vibration power.

BACKGROUND ART

A horizontally-driven vibration body disclosed in Patent Document 1 includes a pair of end covers for closing the axial opposite openings of a cylindrical case made of a magnetic material and for holding the opposite ends of a fixed shaft made of a magnetic material, a cylindrical coil fixed to the inner circumferential surface of the cylindrical case and wound in one direction, a radially-magnetized cylindrical permanent magnet magnetically coupled with the cylindrical coil through an outer circumferential air gap, a pair of radial bearings held at the axial opposite ends of the cylindrical permanent magnet and axially slidably fitted to the fixed shaft, and a pair of springs interposed between the end covers and the axial opposite ends of the cylindrical permanent magnet. If an alternating current is supplied to the cylindrical coil, magnetic fluxes flow through the cylindrical coil existing between the outer circumferential surface of the cylindrical permanent magnet and the cylindrical case. Thus, an alternating axial Lorentz force is generated in the cylindrical permanent magnet as a drive member. The cylindrical permanent magnet is alternately driven to the left and the right in the horizontal direction (axial direction), consequently generating linear reciprocating vibration.

Patent Document 1: Japanese Patent Application Publication No. 2003-93968 (FIG. 1)

SUMMARY OF THE INVENTION

Problem to be solved by the Invention

The magnetic circuit of the horizontally-driven vibration body creates a magnetic path in which the magnetic fluxes going out of the outer circumferential surface of the cylindrical permanent magnet as a drive member flow through the cylindrical coil via the outer circumferential air gap, enter the cylindrical case, flow toward the axial outer end portions of the cylindrical case within the cylindrical case, centripetally gather at the opposite ends of the fixed shaft through the end covers, move toward the center of the fixed shaft and come back to the inner circumferential surface of the cylindrical permanent magnet through the inner circumferential air gap. Therefore, the average length of the magnetic path is equal to the total sum of the diameter and the axial length of the cylindrical case and is increased depending on the external size of the cylindrical case as a yoke. For that reason, the density of the magnetic fluxes passing through the cylindrical coil is decreased just as much as the increase in the magnetic resistance. This makes it difficult to obtain high vibration power. In addition to the outer circumferential air gap, there is also provided an inner circumferential air gap in order to avoid sliding contact between the inner circumferential surface of the axially-movable cylindrical permanent magnet and the fixed shaft. The magnetic resistance grows higher just as much as the inner circumferential air gap. The density of the magnetic fluxes passing through the cylindrical coil is decreased just as much as the increase in the magnetic resistance. This makes it difficult to obtain high vibration power.

In view of the problems mentioned above, it is a first object of the present invention to provide a vibration generator capable of reducing the magnetic resistance by shortening the magnetic path length of a magnetic circuit and capable of obtaining high vibration power using a strong Lorentz force.

It is a second object of the present invention to provide a vibration generator capable of excluding, as far as possible, an air gap portion where the magnetic resistance of a magnetic circuit becomes higher and capable of obtaining high vibration power using a strong Lorentz force.

Means for Solving Problem

A vibration generator of the present invention includes a tubular case made of a magnetic material; an end cover arranged to close one axial end opening of the tubular case and to hold a first bearing; a second bearing held at the other axial end of the tubular case; a movable thrust shaft axially movably inserted through the first bearing and the second bearing and made of a non-magnetic material; first and second toroidal coils fixed to an inner circumferential surface of the tubular case in an adjoining relationship with each other; an axially-magnetized first tubular permanent magnet arranged within the tubular case and fixed to the movable thrust shaft extending therethrough; a first annular pole piece arranged within the tubular case and fixed to the movable thrust shaft extending therethrough, the first annular pole piece disposed on one axial end surface of the first tubular permanent magnet and having an outer peripheral edge facing an inner circumferential surface of the first coil; a second annular pole piece arranged within the tubular case and fixed to the movable thrust shaft extending therethrough, the second annular pole piece disposed on the other axial end surface of the first tubular permanent magnet and having an outer peripheral edge facing an inner circumferential surface of the second coil; and a spring means arranged to axially bias the movable thrust shaft with respect to one axial end portion or the other axial end portion of the tubular case.

In this structure, the first tubular permanent magnet is magnetized in the axial direction parallel to the tubular case made of a magnetic material. Therefore, if the other axial end surface of the first tubular permanent magnet is assumed to be, e.g., an N-pole surface, the magnetic flux line flowing from the N-pole surface toward the S-pole surface as one axial end surface of the first tubular permanent magnet moves from the outer peripheral edge of the second annular pole piece toward the tubular case through the outer circumferential air gap and across the electric current flowing through the second coil. Thereafter, the magnetic flux line moves toward one axial end surface within the tubular case and reaches the outer peripheral edge of the first annular pole piece after moving across the electric current flowing through the first coil (the electric current flowing in the opposite direction to the electric current flowing through the second coil) and passing through the outer circumferential air gap. Then, the magnetic flux line comes back to the S-pole surface of the first tubular permanent magnet. Therefore, there is formed a closed magnetic path shorter than a magnetic path around the entirety of the tubular case. This leads to a reduced magnetic resistance. The outer circumferential air gap is formed between the outer peripheral edges of the annular pole pieces and the coils. Nevertheless, it is possible to significantly reduce the magnetic resistance because the movable thrust shaft made of a non-magnetic material makes up a portion of the vibrator and because the magnetic circuit does not include any inner circumferential air gap or the like. Moreover, concentrated magnetic fluxes are formed through the use of the annular pole pieces. It is therefore possible to significantly increase the density of the magnetic fluxes flowing between the outer peripheral edges of the annular pole pieces and the tubular case. Thanks to the three points mentioned above, it is possible to realize a vibration generator capable of obtaining high vibration power using a strong Lorentz force. The first tubular permanent magnet and the first and second annular pole pieces are fixed to the movable thrust shaft made of a non-magnetic material. Since the movable thrust shaft as a mechanical vibrator makes axial reciprocating movement, it is possible to increase the vibration power.

The first coil and the second coil may be parallel-connected to each other. In order to reduce the number of power-feeding terminals, however, it is preferred that the first coil and the second coil are formed by winding wires in the mutually opposite directions and serially connecting the wires.

In the aforementioned case, the inner mechanical vibrator is formed of one magnet and two pole pieces. The outer stator is formed of two coils. In general, the inner mechanical vibrator may be formed of N magnets and (N+1) pole pieces, where the N is a natural number. The vibration power becomes higher as the N grows larger. From the viewpoint of part number and size, it is practically desirable that the N be equal to 2.

The vibration generator, in which the N is equal to 2, further includes: a third coil fixed to the inner circumferential surface of the tubular case at the axially opposite side of the second coil from the first coil; an axially-magnetized second tubular permanent magnet arranged at the axially opposite side of the second annular pole piece from the first tubular permanent magnet, one axial end surface of the second tubular permanent magnet facing the first tubular permanent magnet having the same magnetic polarity as that of the other axial end surface of the first tubular permanent magnet; and a third annular pole piece overlaid on the other axial end surface of the second tubular permanent magnet and having an outer peripheral edge facing an inner circumferential surface of the third coil. If one axial end surface of the second tubular permanent magnet is assumed to be, e.g., an N-pole surface, a part of the magnetic fluxes entering the tubular case from the outer peripheral edge of the second annular pole piece across the electric current flowing through the second coil moves toward the other axial end within the tubular case and reaches the outer peripheral edge of the third annular pole piece after moving across the electric current flowing through the third coil (the electric current flowing in the opposite direction to the electric current flowing through the second coil) and passing through the outer circumferential air gap. Then, the magnetic fluxes come back to the S-pole surface of the second tubular permanent magnet. By the additional installation of one magnet, one pole piece and one coil, it becomes possible to double the Lorentz force.

The second coil and the third coil may be parallel-connected to each other. In order to reduce the number of power-feeding terminals, however, it is preferred that the second coil and the third coil are formed by winding wires in the mutually opposite directions and serially connecting the wires.

Just like the end cover for holding the first bearing, there may be provided an end cover for closing the other axial end opening of the tubular case and for holding the second bearing. In order to reduce the number of parts, however, it is preferred that the tubular case is a closed-bottom tubular case having a bottom plate and further that the second bearing is held by the bottom plate of the closed-bottom tubular case.

In order to increase the weight of the mechanical vibrator and to increase the vibration power, it is preferred that the vibration generator further includes: a first weight body fixed to one axial end portion of the movable thrust shaft; and a second weight body fixed to the other axial end portion of the movable thrust shaft. It is also preferred that the spring means includes a first spring interposed between the end cover and the first weight body and a second spring interposed between the bottom plate and the second weight body. Since the first weight body and the second weight body are symmetrically arranged on the movable thrust shaft at the outer side of the tubular case, it is possible to secure the vibrator mass and to increase the impact resistance when the vibration generator is dropped. In addition, the first weight body and the second weight body each having a suitable mass and shape can be attached afterward.

In case where the vibration generator of the present embodiment is surface-mounted on an electronic circuit board through a reflow process, it is preferred that the vibration generator includes a metal bracket externally fitted to the tubular case at the other axial end of the tubular case. The metal bracket is preferably provided with a soldering-purpose flat surface. The shape of the first weight body and the second weight body is not limited to the cylindrical shape but may be a rectangular columnar shape. The size of the first weight body and the second weight body may be larger than the outer diameter of the metal bracket. All that is required is that holes serving as weight body moving spaces are formed in the electronic circuit board.

It is preferred that the end cover is one-piece provided with an inner cover portion for closing the opening of the tubular case and an outer cover portion fitted to one axial end opening of the metal bracket. This makes it possible to reduce the number of parts.

Effect of the Invention

The present invention can provide a vibration generator capable of significantly reducing the magnetic resistance by shortening the magnetic path length of the magnetic circuit and excluding an unnecessary air gap portion and capable of obtaining high vibration power using a strong Lorentz force.

DESCRIPTION OF EMBODIMENTS

One embodiment of the present invention will now be described with reference to the accompanying drawings.

Figure 1:
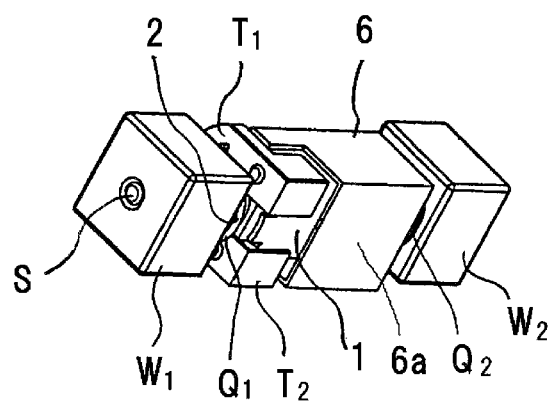
FIG. 1 is a perspective view showing the internal structure of a vibration generator according to one embodiment of the present invention.
Figure 2:
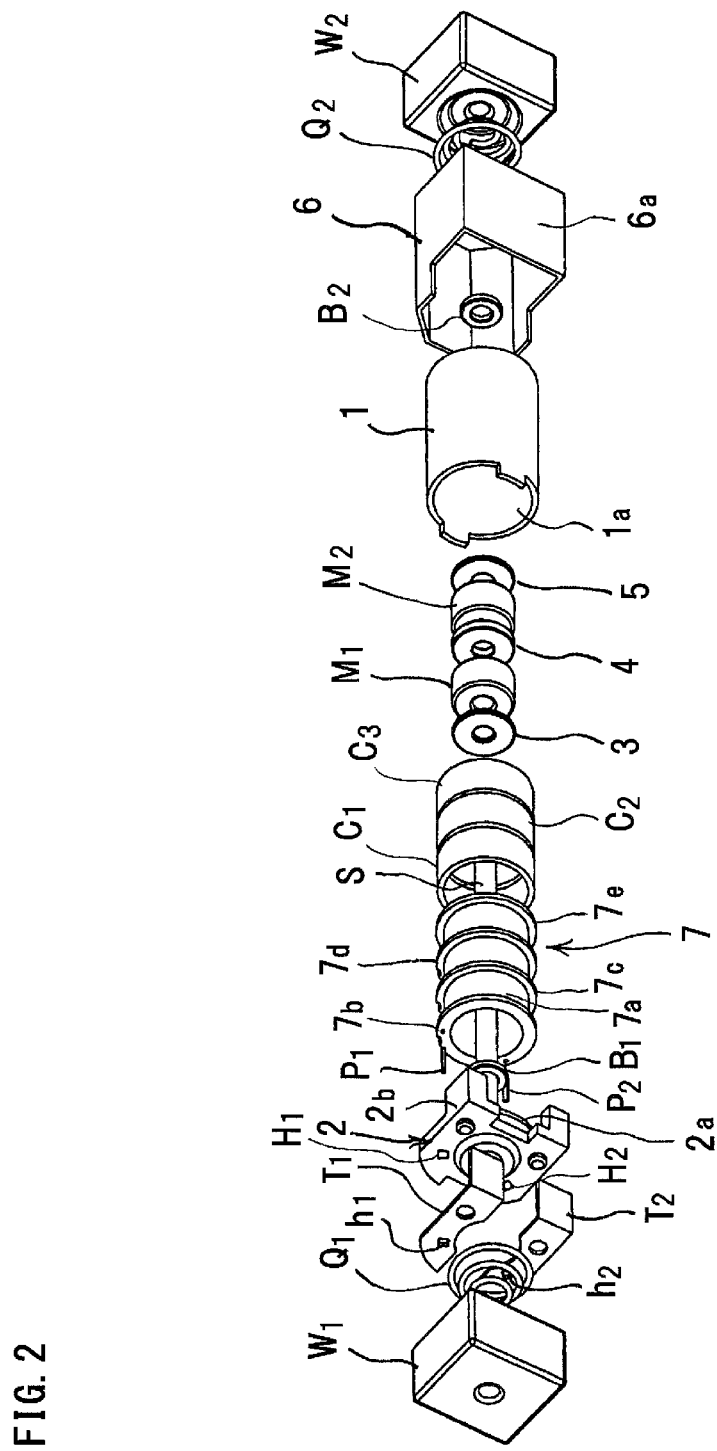
FIG. 2 is a assembled perspective view of the vibration generator according to one embodiment of the present invention.
Figure 3:
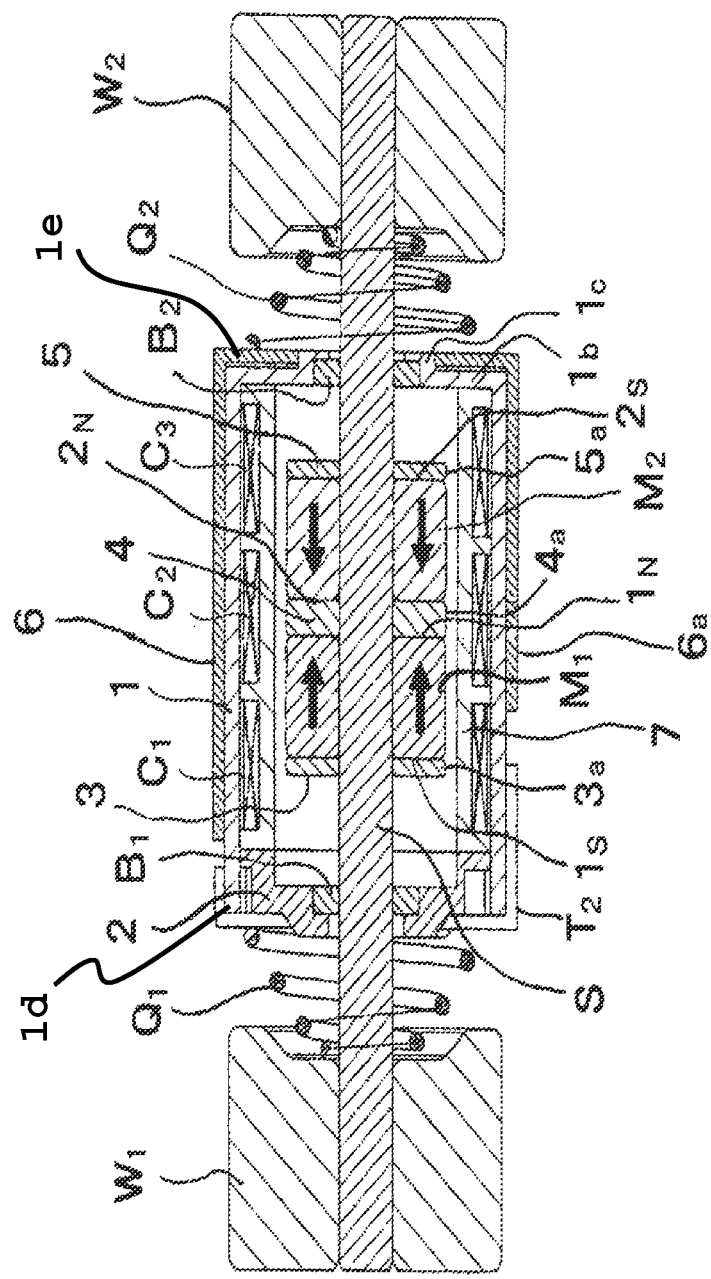
FIG. 3 is a section view of the vibration generator according to one embodiment of the present invention.

The present vibration generator, which serves to generate linear reciprocating vibration, preferably includes a closed-bottom cylindrical case 1 made of a magnetic material, a resin-made end cover (end bracket) 2 for closing one axial end opening 1$a$ of the cylindrical case 1 and for holding a first bearing metal $B_1$, a second bearing metal $B_2$ held within a burring portion 1$c$ of a bottom plate 1$b$ existing at the other axial end of the cylindrical case 1, a movable thrust shaft S axially movably inserted through the first bearing metal $B_1$ and the second bearing metal $B_2$ and made of a non-magnetic material such as a stainless steel or the like, first to third toroidal coils $C_1$, $C_2$ and $C_3$ fixed to the inner circumferential surface of the cylindrical case 1 in a spaced-apart adjoining relationship with one another, an axially-magnetized first tubular permanent magnet $M_1$ arranged within the cylindrical case 1 and fixed to the movable thrust shaft S extending therethrough, a first annular pole piece 3 arranged within the cylindrical case 1 and fixed to the movable thrust shaft S extending therethrough, the first annular pole piece 3 overlaid on an S-pole surface $1_S$ as one axial end surface of the first tubular permanent magnet $M_1$ and having an outer peripheral edge 3a facing the inner circumferential surface of the first toroidal coil $C_1$, a second annular pole piece 4 arranged within the cylindrical case 1 and fixed to the movable thrust shaft S extending therethrough, the second annular pole piece 4 overlaid on an N-pole surface $1_N$ as the other axial end surface of the first tubular permanent magnet $M_1$ and having an outer peripheral edge 4a facing the inner circumferential surface of the second toroidal coil $C_2$, an axially-magnetized second tubular permanent magnet $M_2$ having an N-pole surface $2_N$ overlaid on the opposite surface of the second annular pole piece 4 from the first tubular permanent magnet $M_1$, the second annular pole piece 4 larger in thickness than the first annular pole piece 3 arranged between the first tubular permanent magnet $M_1$ and the second tubular permanent magnet $M_2$, a third annular pole piece 5 overlaid on an S-pole surface $2_S$ as the other axial end surface of the second tubular permanent magnet $M_2$ and having an outer peripheral edge 5a facing the inner circumferential surface of the third toroidal coil $C_3$, a rectangular columnar first weight body $W_1$ fitted and fixed to one axial end of the movable thrust shaft S, a second weight body $W_2$ fitted and fixed to the other axial end of the movable thrust shaft S, a spiral first coil spring $Q_1$ interposed between the end cover 2 and the first weight body $W_1$, a spiral second coil spring $Q_2$ interposed between the bottom plate 1b of the cylindrical case 1 and the second weight body $W_2$, a substrate-mounting metal bracket 6 externally fitted to the cylindrical case 1 from the other axial end side of the cylindrical case 1, a resin-made coil bobbin 7 arranged to accommodate the first to third toroidal coils $C_1$, $C_2$ and $C_3$, and a pair of L-like power-feeding terminal plates $T_1$ and $T_2$ having pin holes $h_1$ and $h_2$ into which terminal pins $P_1$ and $P_2$ axially protruding from an outer flange portion 7b arranged at one axial end of the coil bobbin 7 are inserted and soldered through through-holes $H_1$ and $H_2$ of the end cover 2. The cylindrical case 1 has a first axial end 1d end and a second axial end 1e as shown in FIG. 3.

The first annular pole piece 3, the first tubular permanent magnet $M_1$, the second annular pole piece 4, the second tubular permanent magnet $M_2$ and the third annular pole piece 5 are arranged within the cylindrical case 1 and are fixed to the movable thrust shaft S made of a non-magnetic material. The second annular pole piece 4 may be interposed between the S-pole surfaces $1_S$ and $2_S$. In the present embodiment, the first weight body $W_1$ and the second weight body $W_2$ are fixed to the opposite ends of the movable thrust shaft S at the outer sides of the cylindrical case 1.

The metal bracket 6 is an attachment-purpose component for surface-mounting the vibration generator on an electronic circuit board by way of reflow. The metal bracket 6 is a hexagonal tubular body having a soldering-purpose flat bottom surface 6a.

The coil bobbin 7 preferably includes a winding core tube 7a, an outer flange portion 7b arranged at one axial end of the winding core tube 7a, an outer flange portion 7c for isolating the first toroidal coil $C_1$ and the second toroidal coil $C_2$, an outer flange portion 7d for isolating the second toroidal coil $C_2$ and the third toroidal coil $C_3$, and an outer flange portion 7e arranged at the other axial end of the winding core tube 7a.

In the present embodiment, the first to third toroidal coils $C_1$, $C_2$ and $C_3$ are formed of a single wire. The first toroidal coil $C_1$ and the second toroidal coil $C_2$ are formed by winding wires in the mutually opposite directions and serially connecting the wires. The second toroidal coil $C_2$ and the third toroidal coil $C_3$ are formed by winding wires in the mutually opposite directions and serially connecting the wires. Therefore, it will suffice if the number of the terminal pins $P_1$ and $P_2$ making up power-feeding terminals is two. In order to generate vibration, an alternating current is supplied to the terminal pins $P_1$ and $P_2$.

The end cover 2 is one-piece provided with an inner cover portion 2a for closing the opening 1a of the cylindrical case 1 and an outer cover portion 2b fitted to one axial end opening of the metal bracket 6.

In the structure of the present embodiment, the first tubular permanent magnet $M_1$ and the second tubular permanent magnet $M_2$ are magnetized in the axial direction parallel to the cylindrical case 1 made of a magnetic material. Therefore, as shown in FIG. 3, if the other axial end surface of the first tubular permanent magnet $M_1$ and one axial end surface of the second tubular permanent magnet $M_2$ are assumed to be, e.g., N-pole surfaces $1_N$ and $2_N$, the magnetic force lines flowing from the N-pole surfaces $1_N$ and $2_N$ toward the S-pole surface $1_S$ as one axial end surface of the first tubular permanent magnet $M_1$ or toward the S-pole surface $2_S$ as the other axial end surface of the second tubular permanent magnet $M_2$ moves from the outer peripheral edge 4a of the second annular pole piece 4 toward the cylindrical case 1 through the outer circumferential air gap and across the electric current flowing through the second toroidal coil $C_2$. Then, the magnetic force lines are divided into first magnetic force lines and second magnetic force lines. The first magnetic force lines move toward one axial end surface within the cylindrical case 1 and reaches the outer peripheral edge 3a of the first annular pole piece 3 after moving across the electric current flowing through the first toroidal coil $C_1$ (the electric current flowing in the opposite direction to the electric current flowing through the second toroidal coil $C_2$) and passing through the outer circumferential air gap. Then, the first magnetic force lines come back to the S-pole surface $1_S$ of the first tubular permanent magnet $M_1$. The second magnetic force lines move toward the other axial end within the cylindrical case 1 and reaches the outer peripheral edge 5a of the third annular pole piece 5 after moving across the electric current flowing through the third toroidal coil $C_3$ (the electric current flowing in the opposite direction to the electric current flowing through the second toroidal coil $C_2$) and passing through the outer circumferential air gap. Then, the second magnetic force lines come back to the S-pole surface $2_S$ of the second tubular permanent magnet $M_2$. Therefore, there is formed a closed magnetic path shorter than a magnetic path around the entirety of the cylindrical case 1. This leads to a reduced magnetic resistance. The outer circumferential air gap is formed between the outer peripheral edges 3a, 4a and 5a of the first to third annular pole pieces 3, 4 and 5 and the first to third toroidal coils $C_1$, $C_2$ and $C_3$. Nevertheless, it is possible to significantly reduce the magnetic resistance because the movable thrust shaft S made of a non-magnetic material makes up a portion of the vibrator and because the magnetic circuit does not include any inner circumferential air gap or the like. Moreover, concentrated magnetic fluxes are formed through the use of the first to third annular pole pieces 3, 4 and 5. It is therefore possible to significantly increase the density of the magnetic fluxes flowing between the outer peripheral edges 3a, 4a and 5a and the cylindrical case 1. Thanks to the three points mentioned above, it is possible to realize a vibration generator capable of obtaining high vibration power using a strong Lorentz force. The first and second tubular permanent magnets $M_1$ and M2 and the first to third annular pole pieces 3, 4 and 5 are fixed to the movable thrust shaft S made of a non-magnetic material. The movable thrust shaft S as a mechanical vibrator makes axial reciprocating movement. It is therefore possible to increase the vibration power. The movable thrust shaft S may be made of any non-magnetic material including a metal and a resin.

An open-bottom cylindrical case may be used in place of the closed-bottom cylindrical case 1. In order to reduce the number of parts, however, it is desirable to use the closed-bottom cylindrical case 1 with the second bearing metal $B_2$ held by the bottom plate 1b thereof. In the present embodiment, the first weight body $W_1$ and the second weight body $W_2$ are symmetrically arranged on the movable thrust shaft S at the outer side of the closed-bottom cylindrical case 1. It is therefore possible to secure the vibrator mass and to increase the impact resistance when the vibration generator is dropped. In addition, the first weight body $W_1$ and the second weight body $W_2$ each having a suitable mass and shape can be attached afterward.

In case where the vibration generator of the present embodiment is surface-mounted on an electronic circuit board through a reflow process, the vibration generator includes the metal bracket 6 externally fitted to the closed-bottom cylindrical case 1 at the other axial end of the cylindrical case 1. The metal bracket 6 is provided with the soldering-purpose flat bottom surface 6a. When the vibration generator is installed on the electronic circuit board, balance is kept by the first weight body $W_1$ and the second weight body $W_2$. This makes it possible to prevent falling of the vibration generator. The size of the first weight body $W_1$ and the second weight body $W_2$ may be larger than the outer diameter of the metal bracket 6. All that is required is that holes serving as weight body moving spaces are formed in the electronic circuit board.

Since the end cover 2 is one-piece provided with the outer cover portion 2b fitted to the opening of the metal bracket 6, it is possible to reduce the number of parts.

In the aforementioned embodiment, the first weight body $W_1$, the second weight body $W_2$, the first coil spring $Q_1$ and the second coil spring $Q_2$ are exposed to the outside of the closed-bottom cylindrical case 1. However, if a closed-bottom cylindrical case 1 having a large size is used, it becomes possible to accommodate the first weight body $W_1$, the second weight body $W_2$, the first coil spring $Q_1$ and the second coil spring $Q_2$ therein. The spring may be single.

EXPLANATIONS OF LETTERS OR NUMERALS 1 closed-bottom cylindrical magnetic case
1a opening
1b bottom plate
1c burring portion
1S, 2S S-pole surface
1N, 2N N-pole surface
2 resin-made end cover
2a inner cover portion
2b outer cover portion
3 first annular pole piece
3a,4a,5a outer peripheral edge
4 second annular pole piece
5 third annular pole piece
6 substrate-mounting metal bracket
6a soldering-purpose flat bottom surface
7 coil bobbin
7a winding core tube
7b,7c,7d,7e outer flange portion
$B_1$ first bearing metal
$B_2$ second bearing metal
$C_1$ first toroidal coil
$C_2$ second toroidal coil
$C_3$ third toroidal coil
$H_1$, $H_2$ through-hole
$h_1$, $h_2$ pin hole
$M_1$ axially-magnetized first tubular permanent magnet
$M_2$ axially-magnetized second tubular permanent magnet
$P_1$, $P_2$ terminal pin
$Q_1$ spiral first coil spring
$Q_2$ spiral second coil spring
S thrust shaft
$T_1$, $T_2$ power-feeding terminal plate
$W_1$ first weight body
$W_2$ second weight body

What is claimed is:

1. A vibration generator, comprising:
a tubular case made of a magnetic material, the tubular case having a first axial end and a second axial end opposite to the first axial end;
an end cover arranged to close an opening of the first axial end of the tubular case and to hold a first bearing;
a second bearing held at the second axial end of the tubular case;
a movable thrust shaft axially movably inserted through the first bearing and the second bearing and made of a non-magnetic material;
a coil bobbin made of a resin to accommodate a first coil, a second coil and a third coil, the coil bobbin fixed to an inner circumferential surface of the tubular case such that the first coil, the second coil and the third coil are located in an adjoining relationship with each other;
an axially-magnetized first tubular permanent magnet and an axially-magnetized second tubular permanent magnet, each arranged within the tubular case and fixed to the movable thrust shaft extending therethrough, the axially-magnetized first tubular permanent magnet being closer to the first axial end than the axially-magnetized second tubular permanent magnet;
a first annular pole piece arranged within the tubular case and fixed to the movable thrust shaft extending therethrough, the first annular pole piece overlaid on one axial end surface of the first tubular permanent magnet and having an outer peripheral edge facing an inner circumferential surface of the first coil;
a second annular pole piece arranged within the tubular case and fixed to the movable thrust shaft extending therethrough, the second annular pole piece provided between the axially-magnetized first tubular permanent magnet and the axially-magnetized second tubular permanent magnet, the second annular pole piece facing an inner circumferential surface of the second coil;
a third annular pole piece arranged within the tubular case and fixed to the movable thrust shaft extending therethrough, the third annular pole piece overlaid on one axial end surface of the second tubular permanent magnet and having an outer peripheral edge facing an inner circumferential surface of the third coil, and
a spring means arranged to axially bias the movable thrust shaft with respect to the first axial end or the second axial end of the tubular case wherein both end portions of the movable thrust shaft extend outside the tubular case, the vibration generator further comprising: a first weight body fixed to one axial end portion of the movable thrust shaft outside the tubular case; and a second weight body fixed to the other axial end portion of the movable thrust shaft outside the tubular case.

2. The vibration generator of claim 1, wherein the first coil and the second coil are formed by winding wires in the mutually opposite directions and serially connecting the wires, and the second coil and the third coil are formed by winding wires in the mutually opposite directions and serially connecting the wires.

3. The vibration generator of claim 1, wherein the tubular case has a bottom plate, and the second bearing is held by the bottom plate of the tubular case.

4. The vibration generator of claim 3, wherein the spring means includes a first spring interposed between the end cover and the first weight body and a second spring interposed between the bottom plate and the second weight body.

5. The vibration generator of claim 1, further comprising:
a metal bracket externally fitted to the tubular case at the other axial end of the tubular case, the metal bracket including a soldering-purpose flat surface.

6. The vibration generator of claim 5, wherein the end cover is one-piece provided with an inner cover portion for closing the opening of the tubular case and an outer cover portion fitted to one axial end opening of the metal bracket.

7. The vibration generator of claim 1, wherein the coil bobbin is of a single piece member to accommodate the first coil, the second coil and the third coil.

\* \* \* \* \*